G. CHUMPE.
RAIL JOINT.
APPLICATION FILED NOV. 19, 1915.
1,178,992.
Patented Apr. 11, 1916.
3 SHEETS—SHEET 1.
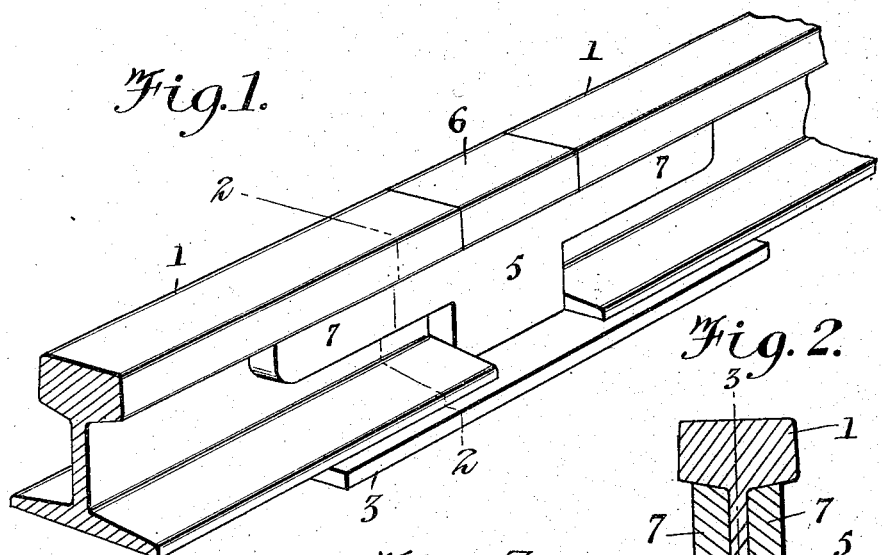
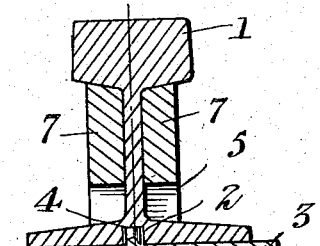
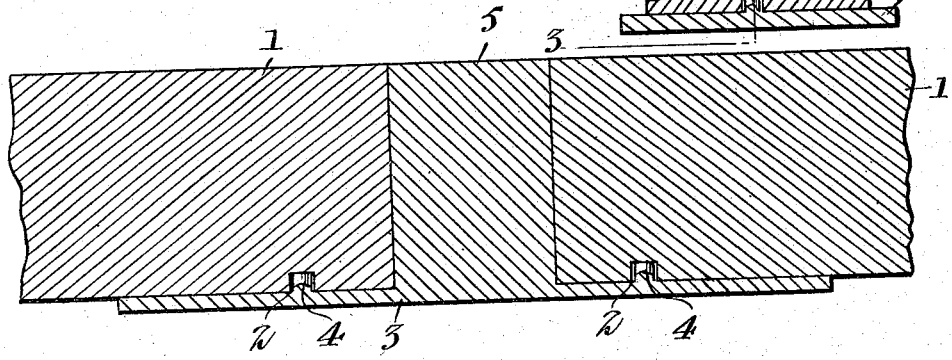
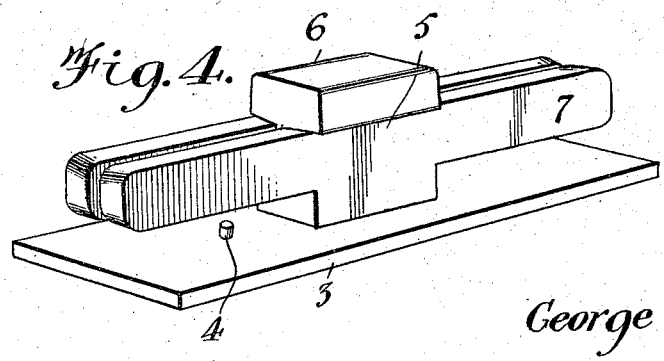
Witnesses
Frederick W. Ely
Inventor
George Chumpe.
By Victor J. Evans
Attorney G. CHUMPE.
RAIL JOINT.
APPLICATION FILED NOV. 19, 1915.
1,178,992.
Patented Apr. 11, 1916.
3 SHEETS—SHEET 2.
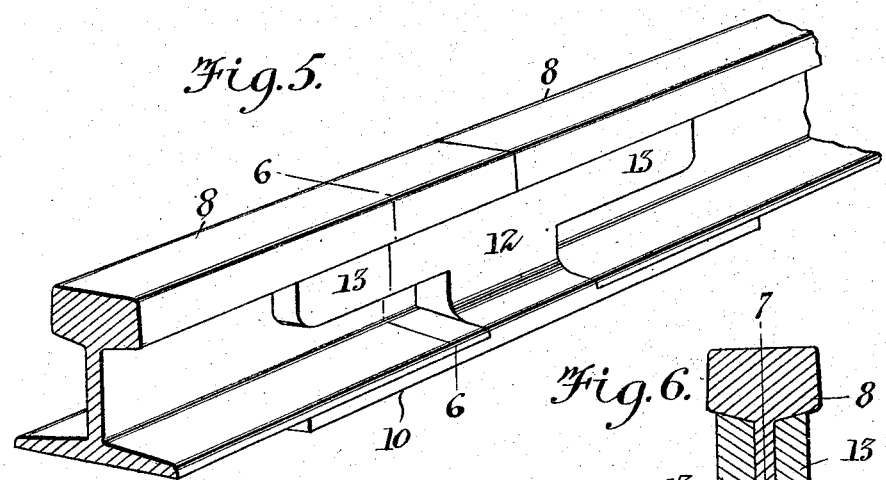
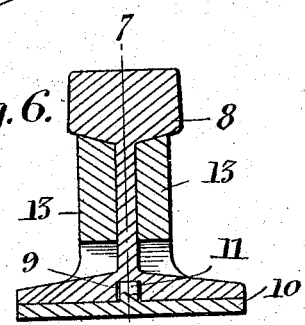
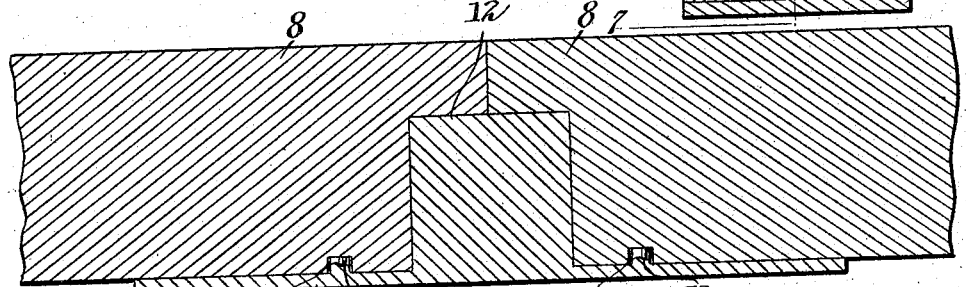
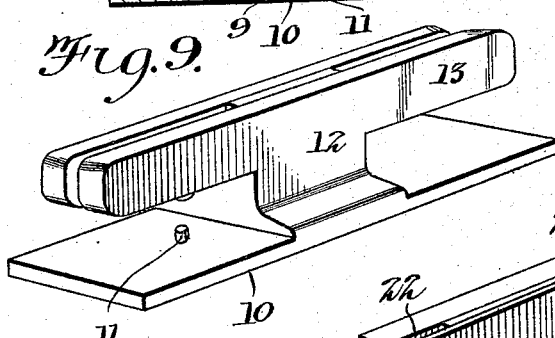
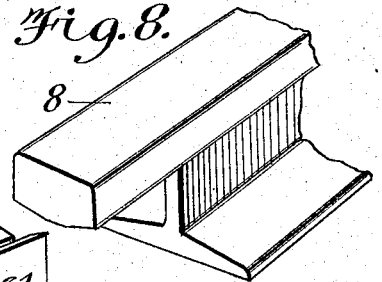
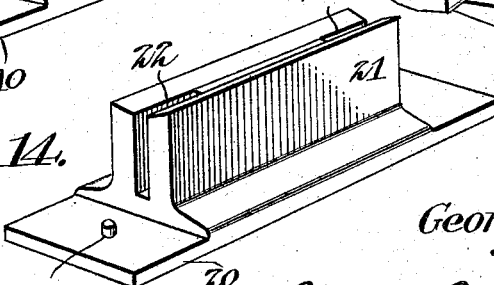
Inventor
George Chumpe.
By Victor J. Evans
Attorney
Witnesses
Frederick W. Ely G. CHUMPE.
RAIL JOINT.
APPLICATION FILED NOV. 19, 1915.
1,178,992.
Patented Apr. 11, 1916.
3 SHEETS—SHEET 3.
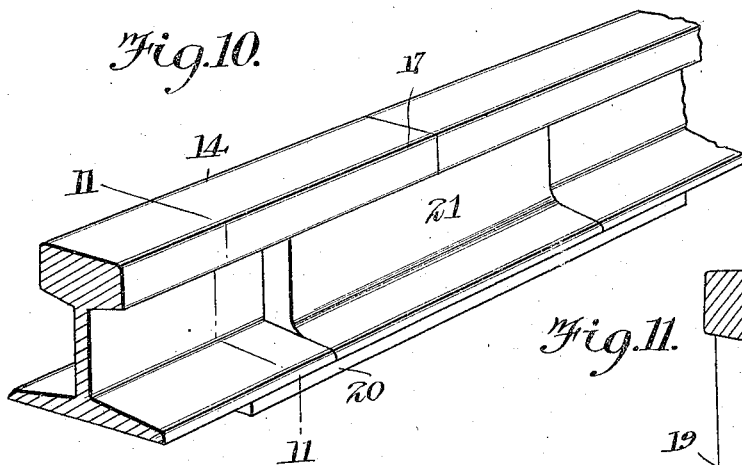
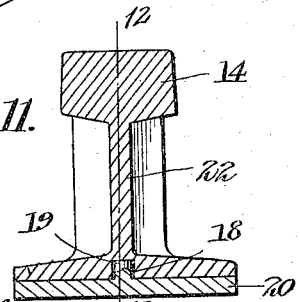
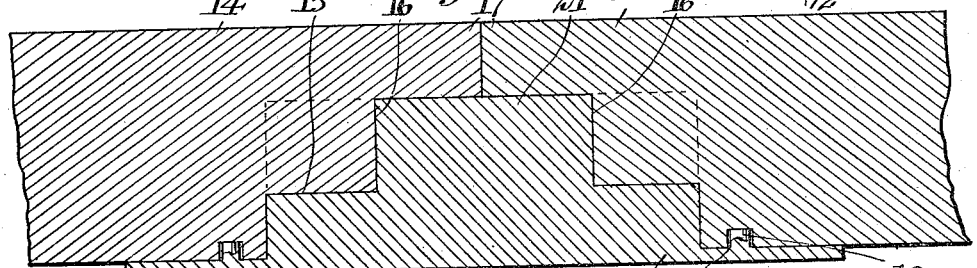
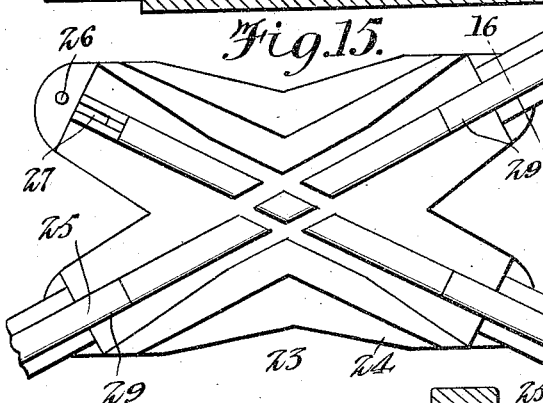
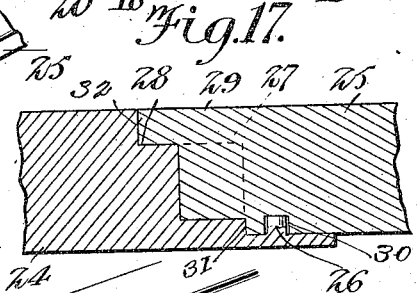
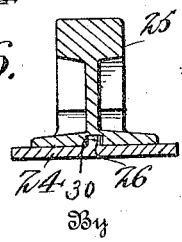
Witnesses
Frederick W. Ely
Wm. J. South
Inventor
George Chumpe.
By Victor J. Evans
Attorney

UNITED STATES PATENT OFFICE.

GEORGE CHUMPE, OF AKRON, OHIO.

RAIL-JOINT.

1,178,992.  Specification of Letters Patent.  Patented Apr. 11, 1916.

Application filed November 19, 1915. Serial No. 62,444.

*To all whom it may concern:*

Be it known that I, GEORGE CHUMPE, a subject of Austria-Hungary, residing at Akron, in the county of Summit and State of Ohio, have invented new and useful Improvements in Rail-Joints, of which the following is a specification.

The present invention relates to improvements in means for connecting the meeting ends of railway rails, and the object of the invention is to simplify and improve the existing art by producing a rail joint which can be easily and quickly assembled, and which will sustain the rails against vertical and lateral movement and to permit only a limited longitudinal movement such as is necessary in the expansion and contraction of the rails.

With the above and other objects in view, the improvement resides in the construction, combination and arrangement of parts set forth in the following specification and falling within the scope of the appended claims.

In the drawings: Figure 1 is a perspective view of two rails connected in accordance with the present invention, Fig. 2 is a transverse sectional view approximately on the line 2—2 of Fig. 1, Fig. 3 is a longitudinal sectional view approximately on the line 3—3 of Fig. 2, Fig. 4 is a perspective view of the chair, Fig. 5 is a perspective view of a modification, Fig. 6 is a transverse sectional view approximately on the line 6—6 of Fig. 5, Fig. 7 is a longitudinal sectional view approximately on the line 7—7 of Fig. 6, Fig. 8 is a perspective view of one of the rail ends, Fig. 9 is a similar view of the chair, Fig. 10 is a perspective view of a still further modification, Fig. 11 is a sectional view approximately on the line 11 of Fig. 12, Fig. 12 is a longitudinal sectional view approximately on the line 12—12 of Fig. 11, Fig. 13 is a perspective view of one of the rail ends, Fig. 14 is a similar view of the chair, Fig. 15 is a view illustrating the manner in which the rails can be connected to a crossing or frog, Fig. 16 is a transverse sectional view approximately on the line 16—16 of Fig. 15, and Fig. 17 is a longitudinal sectional view approximately on the line 17—17 of Fig. 16.

In Figs. 1 to 4 the rails 1—1 are of the ordinary construction but have their base portions, a suitable distance adjacent their ends formed each with a centrally disposed slot or socket 2. The chair or joint member includes a base 3 upon which the base flanges of the rails are adapted to rest, and the said base is centrally formed at suitable points with vertically extending studs 4 which are adapted to be received in the sockets 2 of the rails 1. Centrally formed with the base 3, at an equal distance from the studs 4 is a vertical extension or block 5, the same having its upper portion formed with a head 6 against which the heads of the said rails 1 are adapted to abut. The block below the head 6 is provided with longitudinally extending side members 7, the side members or arms being arranged in spaced pairs and the lower edges of said sides are disposed a suitable distance above the base above the studs 4, the space thus provided being sufficient to permit of the base flanges of the rails being inserted over the base, while the webs of the rails are received within the space between each pair of arms, so that when the ends of the rails contact with the opposite ends of the block member 5, the sockets 2 will be in alinement with the studs 4, and by allowing the base portions of the rails to rest upon the base 3 of the chair, the heads of the rails will be brought into proper alinement with the head 6 of the block member 5. The spaced sides or arms 7 are adapted to frictionally contact with the opposite sides of the webs of the rails and the upper edges of said members 7 also underlie the heads of the rails, and the co-engagement of the studs 4 with the walls of the sockets 2 provide ample means for connecting the rails without the employment of additional securing elements.

In Figs. 5 to 9 the rails 8—8 have their body portions of the usual construction, but the said rails at their ends, have both their base flange and their webs cut-away to provide a head extension, and the base of each of the rails is centrally provided with a vertically extending socket 9. The chair or connecting member includes a base 10 having vertically projecting studs 11, the said studs being received in the sockets of the respective rail ends 8—8. The base is centrally formed with a vertical extension or block 12, and the said block, at the upper edge thereof, is formed with longitudinally extending arms or sides 13—13. The space between each pair of sides 13 is sufficient to snugly receive the webs of the rails 8—8 and the upper edges of the sides are arranged flush or in a line with the upper edges of the block 12, while the lower edges of said sides are disposed a distance above the base and above the studs 11 sufficient to permit of the rails being inserted longitudinally between the sides from the opposite ends of the connecting member or chair so that the cut ends of the base and web of the said rails 8 contact with the opposite ends of the block 12, the rails may be lowered and their sockets 9 receive the studs 11, while the extending heads rest upon the upper face of the block 12.

In Figs. 10 to 14, the rails 14—14 have their bodies of the ordinary construction, but the base flanges of the rails, at a suitable distance from their ends are cut transversely to provide shoulders 15, and the webs of the said rails are cut longitudinally from the said shoulders toward the ends of the rails and are from thence cut vertically providing vertical shoulders 16 which are disposed a suitable distance from the extending heads 17 of the said rail ends, it being understood that the webs of the rails are cut horizontally in a line with the underfaces of the heads to the mentioned shoulders 16. The base portions of the rails are centrally provided with sockets 18 which are adapted to receive studs 19 provided in the base portion 20 of the chair or connecting member for the rails. Arising from the base 20 and only a slight distance from the studs 19 is a vertical extension or block 21, the same having its opposite ends provided with centrally disposed substantially rectangular slots 22—22, the lower walls of said slots being disposed a suitable distance above the base portion 20, so as to provide a wall or ledge to receive the lower edge of the web of each of the rails between the shoulders 15 and 16, while the extending heads 17 rest upon the horizontally straight upper face of the block 22. The side walls provided by the depressions 22 are adapted to snugly receive the sides of the web beyond the shoulder 15, and such contacting engagement between the rails and the block as well as the stud and socket engagement between the block and rails maintain the heads of the rails in longitudinal alinement, as will readily be understood.

In the remaining figures of the drawings I have illustrated the manner in which the rail constructed in accordance with my invention may be secured to a frog or crossing without the employment of additional retaining or securing elements. In the showing of the drawings, the frog or crossing is indicated by the numeral 23, and the base 24 of the said frog, centrally of and adjacent each of the rail sections 25 formed upon the said frog or crossing has an upstanding stud 26, while the ends of the rail members 25 are centrally formed with a substantially rectangular depression 27, and the webs of the said members are cut horizontally as indicated by the numerals 28. The ends of the rails, indicated by the numerals 29, are substantially similar to those described in connection with Figs. 10 to 14, each of said rail members having its base provided with a socket 30 to receive one of the studs 26 and having its base flange terminating away from the end of its web and forming the said base flange with a shoulder 31, its web terminating away from its head and forming the end of the head with a shoulder 32. The web between the shoulders 31 and 32 is adapted to be received between the side walls provided by one of the depressions 27 and the extending head of each of the rails 29 is adapted to rest upon the horizontally straight cut portion 28 in the rail members 25 of the frog or crossing.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a device for the purpose set forth, rail ends having their base portions provided with sockets, their webs extending beyond their base portions and the heads extending beyond the ends of the webs, a connecting member including a base upon which the rails rest, studs upon the base to be received in the sockets of the rails, a central enlargement formed integral with the base and including spaced sides arranged to contact with the opposite faces of the webs of the rails to provide a rest for the head extensions, and the head extensions of the rails adapted to rest upon the upper face of the said enlargement of the connecting members.

2. In combination, rails having their base formed with sockets, their webs extending beyond the base and the heads extending beyond the webs, a connecting member including a base upon which the rails rest, said base having vertical studs to engage in the sockets in the rails, said base being centrally formed with a vertical extension which is channeled longitudinally from its opposite ends to receive the projecting webs of the rails and to provide a rest for the extending heads of the rails.

In testimony whereof I affix my signature in presence of two witnesses.

GEORGE $\overset{\text{his}}{\underset{\text{mark}}{\times}}$ CHUMPE.

Witnesses:
ADAM PAMER,
LOUIS FRIEDMAN.

Copies of this patent may be obtained for five cents each, by addressing the "Commissioner of Patents, Washington, D. C."